(12) United States Patent
Heinmiller et al.

(10) Patent No.: US 7,706,514 B2
(45) Date of Patent: Apr. 27, 2010

(54) METHOD OF PROVIDING CALLER IDENTIFICATION FOR CALLS PLACED OVER AN INTERNET

(75) Inventors: Wayne Robert Heinmiller, Elgin, IL (US); Robert Wesley Bossemeyer, Jr., St. Charles, IL (US); Bruce Edward Stuckman, Algonquin, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 388 days.

(21) Appl. No.: 11/767,854

(22) Filed: Jun. 25, 2007

(65) Prior Publication Data

US 2007/0269028 A1    Nov. 22, 2007

Related U.S. Application Data

(63) Continuation of application No. 10/658,757, filed on Sep. 8, 2003, now Pat. No. 7,260,385, which is a continuation of application No. 10/171,729, filed on Jun. 14, 2002, now Pat. No. 6,650,743, which is a continuation of application No. 09/591,534, filed on Jun. 9, 2000, now Pat. No. 6,445,781, which is a continuation of application No. 09/154,336, filed on Sep. 16, 1998, now Pat. No. 6,101,246.

(51) Int. Cl.
*H04M 1/56* (2006.01)
*H04M 15/06* (2006.01)

(52) U.S. Cl. .............. 379/142.05; 379/142.01; 379/142.04; 370/356; 370/373; 370/385

(58) Field of Classification Search ............ 379/142.01, 379/142.03, 142.05, 142.06, 229–230, 245, 379/352, 356, 401, 207.15; 370/252, 385, 370/356, 352, 353–355, 357, 373, 389, 401; 455/415; 380/255, 257, 259–260, 282, 283, 380/285

See application file for complete search history.

(56) References Cited

U.S. PATENT DOCUMENTS

| 5,349,638 | A | 9/1994 | Pitroda et al. |
| 5,497,414 | A | 3/1996 | Bartholomew |
| 5,521,969 | A | 5/1996 | Paulus et al. |
| 5,533,106 | A | 7/1996 | Blumhardt |
| 5,546,447 | A | 8/1996 | Skarbo et al. |
| 5,559,860 | A | 9/1996 | Mizikovsky |

(Continued)

OTHER PUBLICATIONS

The Office action issued in connection with U.S. Appl. No. 09/154,336 on Nov. 10, 1999.

(Continued)

*Primary Examiner*—Binh K Tieu
(74) *Attorney, Agent, or Firm*—Hanley, Flight & Zimmerman, LLC

(57) ABSTRACT

The invention uses the advanced intelligent network to provide caller identification for calls placed over the internet (24). A long distance call placed with an internet carrier results in the originating SSP (14) forwarding the call to an originating POP (22) for the internet carrier. The caller ID information is routed through the signaling system 7 network (16) to the SSP (32) in the terminating network. The call is routed to a terminating POP (26) and then to the SSP (32) in the terminating network. The SSP (32) inserts the caller ID information received through the SS7 network (16) and routes the call to the terminating line (30).

8 Claims, 8 Drawing Sheets

U.S. PATENT DOCUMENTS

| | | | |
|---|---|---|---|
| 5,602,908 | A | 2/1997 | Fan |
| 5,724,412 | A | 3/1998 | Srinivasan |
| 5,729,592 | A | 3/1998 | Frech et al. |
| 5,742,670 | A | 4/1998 | Bennett |
| 5,805,688 | A | 9/1998 | Gillespie et al. |
| 5,832,072 | A | 11/1998 | Rozenblit |
| 5,850,435 | A | 12/1998 | Devillier |
| 5,864,612 | A | 1/1999 | Strauss et al. |
| 5,901,207 | A | 5/1999 | Pickeral |
| 5,937,052 | A | 8/1999 | Cook-Hellberg |
| 5,939,980 | A | 8/1999 | Heitmann et al. |
| 5,953,399 | A | 9/1999 | Farris et al. |
| 5,974,128 | A | 10/1999 | Urban et al. |
| 6,058,187 | A * | 5/2000 | Chen .......................... 713/170 |
| 6,122,255 | A | 9/2000 | Bartholomew et al. |
| 6,160,876 | A | 12/2000 | Moss et al. |
| 6,178,232 | B1 | 1/2001 | Latter et al. |
| 6,185,288 | B1 | 2/2001 | Wong |
| 6,215,858 | B1 | 4/2001 | Bartholomew et al. |
| 6,229,883 | B1 | 5/2001 | Kakizaki et al. |
| 6,233,234 | B1 | 5/2001 | Curry et al. |
| 6,275,934 | B1 | 8/2001 | Novicov et al. |
| 6,282,275 | B1 | 8/2001 | Gurbani et al. |
| 6,285,671 | B1 | 9/2001 | Bossemeyer, Jr. et al. |
| 6,292,479 | B1 * | 9/2001 | Bartholomew et al. ...... 370/352 |
| 6,324,271 | B1 | 11/2001 | Sawyer et al. |
| 6,332,021 | B2 | 12/2001 | Latter et al. |
| 6,404,858 | B1 | 6/2002 | Farris et al. |
| 6,411,704 | B1 | 6/2002 | Pelletier et al. |
| 6,421,424 | B1 | 7/2002 | Creamer et al. |
| 6,483,912 | B1 | 11/2002 | Kalmanek et al. |
| 6,498,841 | B2 | 12/2002 | Bull et al. |
| 6,516,057 | B2 | 2/2003 | Meek et al. |
| 6,542,596 | B1 | 4/2003 | Hill et al. |
| 6,553,110 | B1 | 4/2003 | Peng |
| 6,914,899 | B2 | 7/2005 | Siegrist et al. |
| 2001/0040887 | A1 | 11/2001 | Shtivelman et al. |
| 2002/0037076 | A1 * | 3/2002 | Perlmutter .................. 379/219 |
| 2002/0041664 | A1 | 4/2002 | Latter et al. |
| 2003/0066872 | A1 * | 4/2003 | McClure et al. ............... 235/51 |
| 2004/0005045 | A1 | 1/2004 | Adams et al. |
| 2006/0140176 | A1 | 6/2006 | Farris et al. |
| 2006/0153354 | A1 | 7/2006 | Brahm et al. |
| 2006/0203986 | A1 | 9/2006 | Gibson |

OTHER PUBLICATIONS

The supplemental notice of allowability issued in connection with U.S. Appl. No. 09/154,336 on Mar. 13, 2000.
The notice of allowability issued in connection with U.S. Appl. No. 09/154,336 on Mar. 23, 2000.
The notice of allowability issued in connection with U.S. Appl. No. 09/591,534 on Apr. 9, 2002.
The office action issued in connection with U.S. Appl. No. 09/591,534 on Jan. 2, 2002.
The notice of allowability issued in connection with U.S. Appl. No. 09/591,534 on Apr. 9, 2002.
The office action issued in connection with U.S. Appl. No. 10/171,729 on Aug. 27, 2002.
The office action issued in connection with U.S. Appl. No. 10/171,729 on Nov. 5, 2002.
The advisory action issued in connection with U.S. Appl. No. 10/171,729 on Dec. 9, 2002.
The office action issued in connection with U.S. Appl. No. 10/171,729 on Apr. 14, 2003.
The interview summary issued in connection with U.S. Appl. No. 10/171,729 on May 2, 2003.
The office action issued in connection with U.S. Appl. No. 10/171,729 on May 21, 2003.
The notice of allowance issued in connection with U.S. Appl. No. 10/171,729 on Jul. 29, 2003.
The office action issued in connection with U.S. Appl. No. 10/658,757 on Sep. 2, 2005, 12 pages.
The office action issued in connection with U.S. Appl. No. 10/658,757 on Mar. 15, 2006, 10 pages.
The office action issued in connection with U.S. Appl. No. 10/658,757 on Oct. 5, 2006, 13 pages.
The notice of allowance issued in connection with U.S. Appl. No. 10/658,757 on Jun. 6, 2007, 9 pages.
International Searching Authority, International Search Report, issued in connection with PCT/US99/20067 on Nov. 18, 1999, 2 pages.
International Searching Authority, written opinion, issued in connection with PCT/US99/20067 on May 30, 2000, 4 pages.
International Preliminary Examining Authority, International Preliminary Examination Report, issued in connection with PCT/US99/20067 on Oct. 27, 2000, 4 pages.
The notice of allowance issued in connection with CA Patent Application Serial No. 2,343,188 on May 9, 2003, 1 page.

* cited by examiner

METHOD OF PROVIDING CALLER IDENTIFICATION FOR CALLS PLACED OVER AN INTERNET

RELATED APPLICATIONS

This patent arises from a continuation of U.S. patent application Ser. No. 10/658,757, filed on Sep. 8, 2003 now U.S. Pat. No. 7,260,385, which is a continuation of U.S. patent application Ser. No. 10/171,729, filed on Jun. 14, 2002, now U.S. Pat. No. 6,650,743, which is a continuation of U.S. patent application Ser. No. 09/591,534, filed on Jun. 9, 2000, now U.S. Pat. No. 6,445,781, which is a continuation of U.S. patent application Ser. No. 09/154,336, filed on Sep. 16, 1998, now U.S. Pat. No. 6,101,246.

FIELD OF THE INVENTION

The present invention relates generally to telecommunication systems and more particularly to a method of providing caller identification for calls placed over an internet.

BACKGROUND OF THE INVENTION

A number of internet long-distance telephone companies (ITC) have been formed. A caller who uses these companies places a standard long distance telephone call. The call is routed by the public switched telephone network (PSTN) to the internet telephone company's point of presence (POP). The POP formats the call for transport over the internet to a second POP in the destination local access transport area (LATA). The call is then routed over the PSTN to the callee's telephone. In the process the caller identification (Caller ID) information is lost. Even when the internet long distance company places the Caller ID information into the call at the terminating POP, the central office (CO)/service switching point (SSP) rejects the Caller ID information. The CO/SSP checks the Caller ID to determine if it has been tampered with, corrupted or altered. The CO/SSP will reject the Caller ID information since the call appears to originate from the ITC POP and not the originating number.

Thus there exists a need for a method of providing call identification for calls placed over the internet.

DETAILED DESCRIPTION OF THE DRAWINGS

The invention uses the advanced intelligent network to provide caller identification for calls placed over the internet. A long distance call placed with an internet carrier results in the originating SSP forwarding the call to an originating POP for the internet carrier. In one embodiment, the caller ID information is routed through the signaling system 7 (SS7) network to the SSP in the terminating network. The call is routed to a POP in the terminating network and then to the SSP in the terminating network. The SSP inserts the caller ID information received through the SS7 network and routes the call to the terminating line. In another embodiment the caller ID information is encrypted and passed through the internet. The SSP in the terminating network then sends an authentication query to a service control point (SCP). The SCP determines if the encrypted caller ID is valid. In one embodiment the caller ID information is considered valid if it can be decrypted. When the encrypted caller ID is valid, the call is routed to the terminating line with the caller ID information. In another embodiment, an authentication code is sent as part of the caller ID information. When the authentication code is valid the caller ID information is routed to the terminating line.

Figure 1:
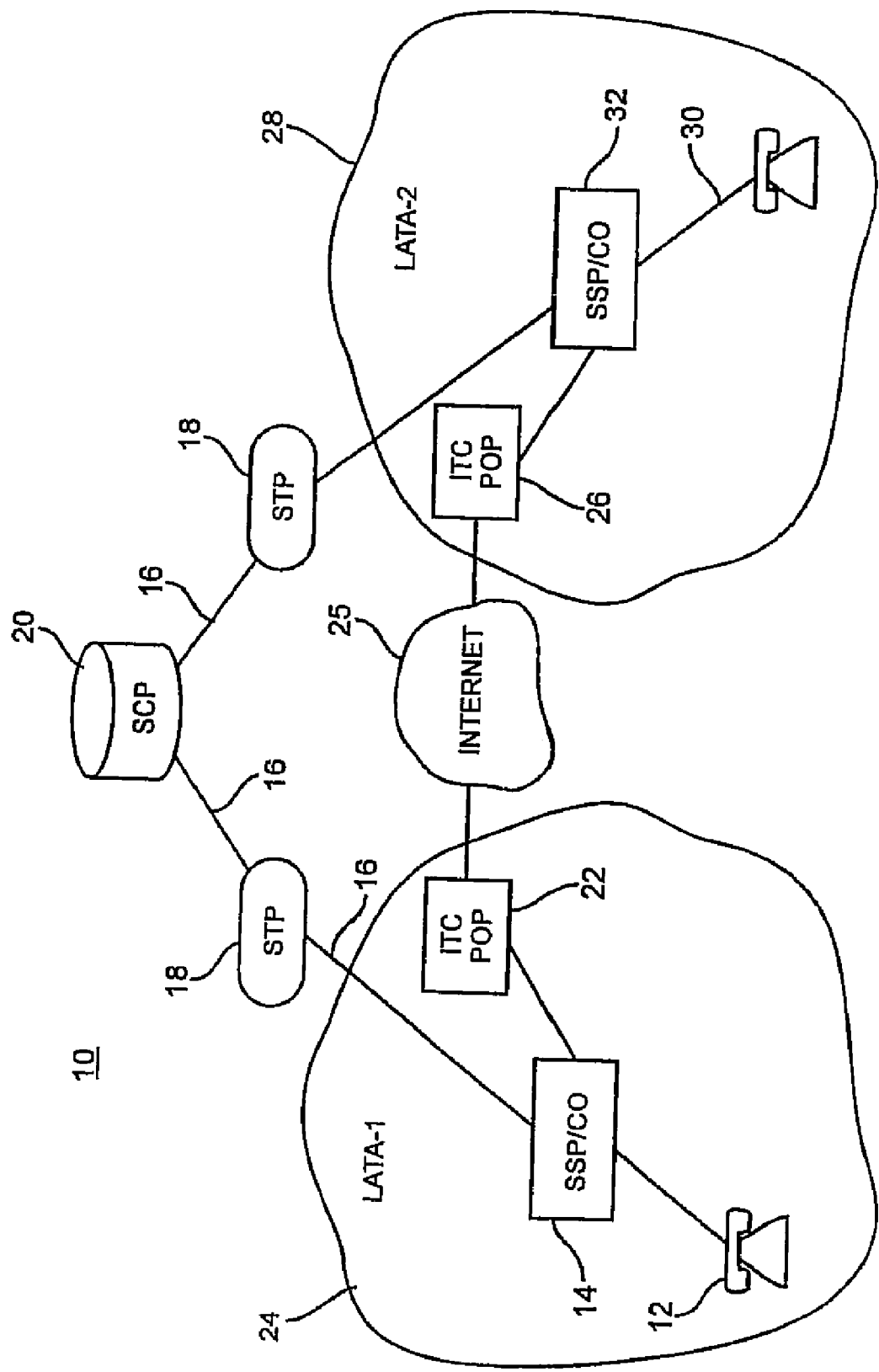
FIG. 1 is a block diagram of a system for providing caller identification information for an internet telephone carrier, in accordance with one embodiment of the invention.

FIG. 1 is a block diagram of a system 10 for providing caller identification information for an internet telephone carrier, in accordance with one embodiment of the invention. A standard long distance call placed through an internet telephone carrier (ITC), starts by a subscriber 12 dialing the long distance number. An originating SSP/CO 14 triggers on the long distance number and sends a routing query through the SS7 network 16. The SS7 network 16 has a plurality of signal transfer points 18 that route the query to the appropriate service control point (SCP) 20. The SCP 20 analyzes the routing query containing the originating telephone line and the dialed long distance number. Based on this information the SCP 20 determines the call must be routed to the ITC's POP 22 in the first LATA 24. The SSP 14 receives routing instruction to the ITC POP 22, and routes the call to the ITC POP 22. The ITC POP 22 routes the call over the internet 25 to a second ITC POP 26. The second ITC POP 26 is in a second LATA 28 containing the terminating line 30. The ITC POP 26 routes the call to a second SSP/CO 32. The SSP/CO 32 then routes the call to the terminating line 30. The invention uses the intelligent part of the advanced intelligent network, to pass either the caller ID information around the internet 25 or authentication information through the internet 25. In one embodiment, the caller ID information is routed from the SSP 14 through the signal network to the SSP 32. The SSP 32 then matches the caller ID information with the appropriate call. The match, in one embodiment, is performed by knowing the originating line and dialed telephone number. In another embodiment, the caller ID information is encrypted. The SSP 32 then sends a authentication query to the SCP 20, that determines if the encrypted caller ID information can be decrypted which authenticates the information. The caller ID information is added to the call routed to the terminating line 30. Note that throughout this document caller ID information can include both the caller ID and charged party ID. The charged party ID is used for billing purposes.

Figure 2:
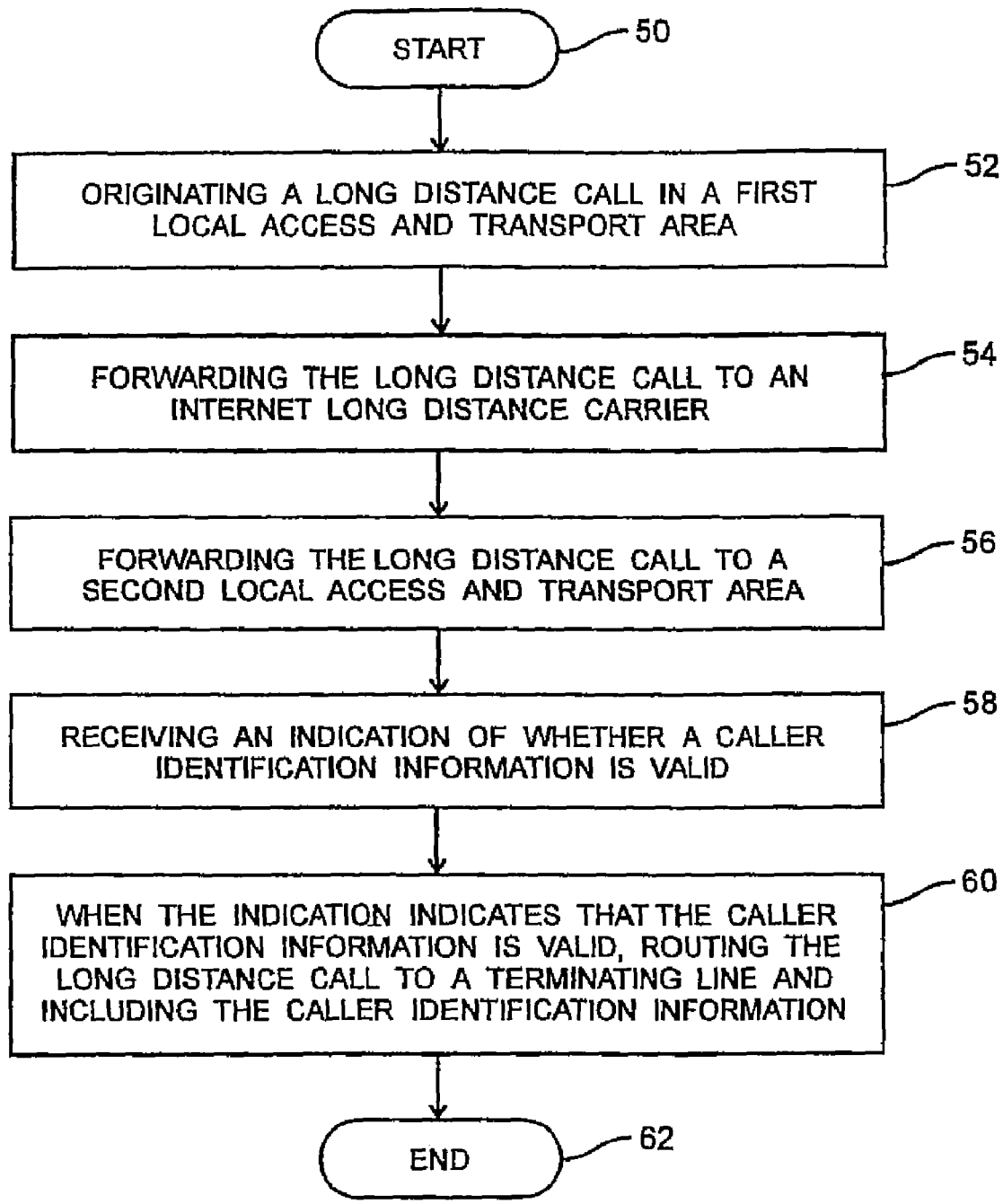
FIG. 2 is a flow chart of the steps used in providing caller identification for calls placed over the internet in accordance with one embodiment of the invention.

FIG. 2 is a flow chart of the steps used in providing caller identification for calls placed over the internet in accordance with one embodiment of the invention. The process starts, step 50, by originating a long distance call in a first local access and transport area at step 52. The long distance call is forwarded to an internet long distance carrier at step 54. Next, the long distance call is forwarded to a second local access and transport area step 56. An indication of whether a call identification information is valid is received at step 58. When, at step 60, the indication indicates that the caller identification information is valid, the long distance call is routed to a terminating line and includes the caller identification information which ends the process at step 62. In one embodiment, the long distance call is routed to the terminating line without the caller identification information, when the indication indicates that the caller identification information is not valid. In another embodiment, the first local access and transport area can be the same as the second local access and transport area. In another embodiment, the long distance call is routed to the terminating line with an indicator that the caller identification information is unreliable. In another embodiment, a routing query is sent from a SSP in the first LATA to a SCP. A routing instruction is received from the SCP that includes an encrypted code.

In another embodiment a caller identification query, including the encrypted code, is sent from the SSP in the second LATA to a SCP. In one embodiment the encrypted code includes the caller identification information. In another embodiment the encrypted code is an authentication code and the caller ID information is sent unencrypted. The SCP determines if the encrypted code is valid. When the encrypted code is valid, the SCP sends a valid indication to the SSP in the second LATA.

In another embodiment the SSP in the first LATA sends a routing query to the SCP. The caller identification information is sent over the signaling network to the destination SSP in the second LATA.

Figure 3:
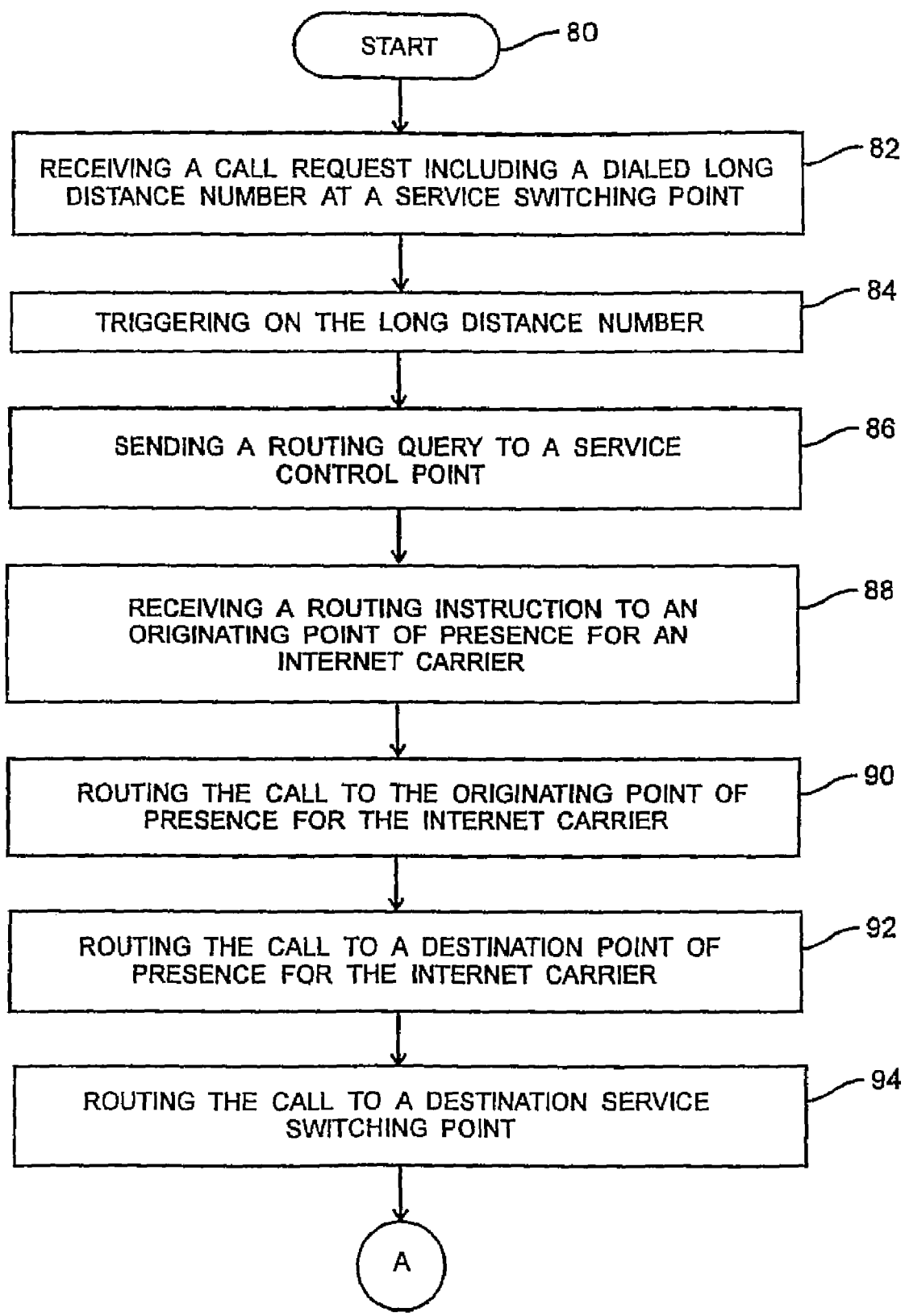
FIGS. 3 & 4 are a flow chart of the steps used in providing caller identification for calls placed over the internet in accordance with one embodiment of the invention.
Figure 4:
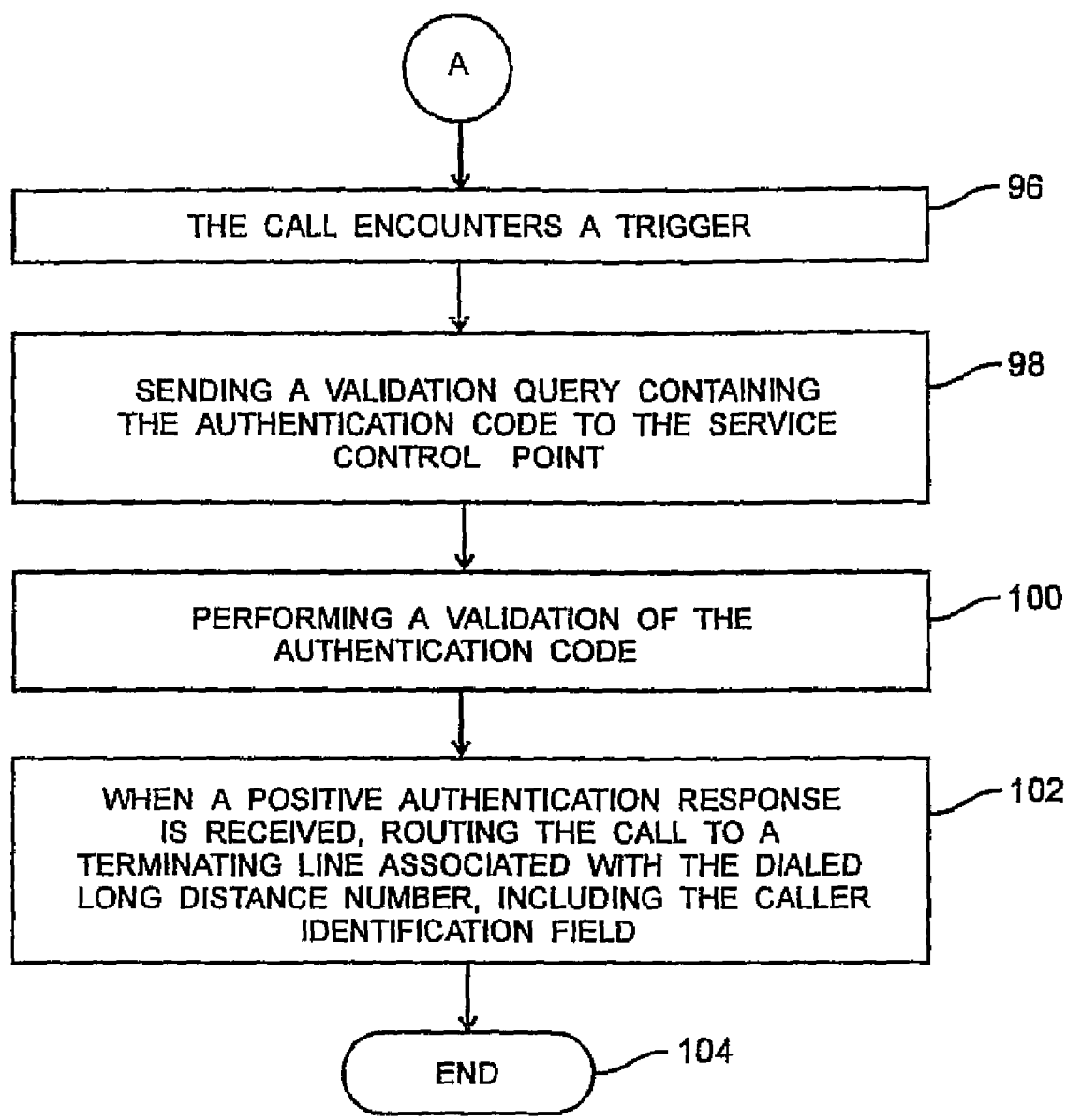

FIGS. 3 & 4 are a flow chart of the steps used in providing caller identification for calls placed over the internet in accordance with one embodiment of the invention. The process starts, step 80, by receiving a dialed long distance number at an originating service switching point at step 82. The dialed long distance number is triggered on at step 84. A routing query is sent to a service control point, that contains the dialed long distance number and an originating telephone line at step 86. When the call requires routing to an internet telephone carrier, a routing response is sent that includes an authentication code at step 88. The call is routed, including a caller identification field, to an originating point of presence for the internet telephone carrier at step 90. The call is routed over the internet to a destination point of presence for the internet telephone carrier at step 92. The call is routed to a destination service switching point at step 94. The call encounters a trigger at step 96. An authentication query containing the authentication code is sent to the service control point at step 98. The authentication code is validated at step 100. When, at step 102, a positive authentication response is received, the call is routed to a terminating line associated with the dialed long distance number and includes the caller identification field which ends the process at step 104. In another embodiment the call is routed to the terminating line without the caller identification field when the positive validation response is not received.

Figure 5:
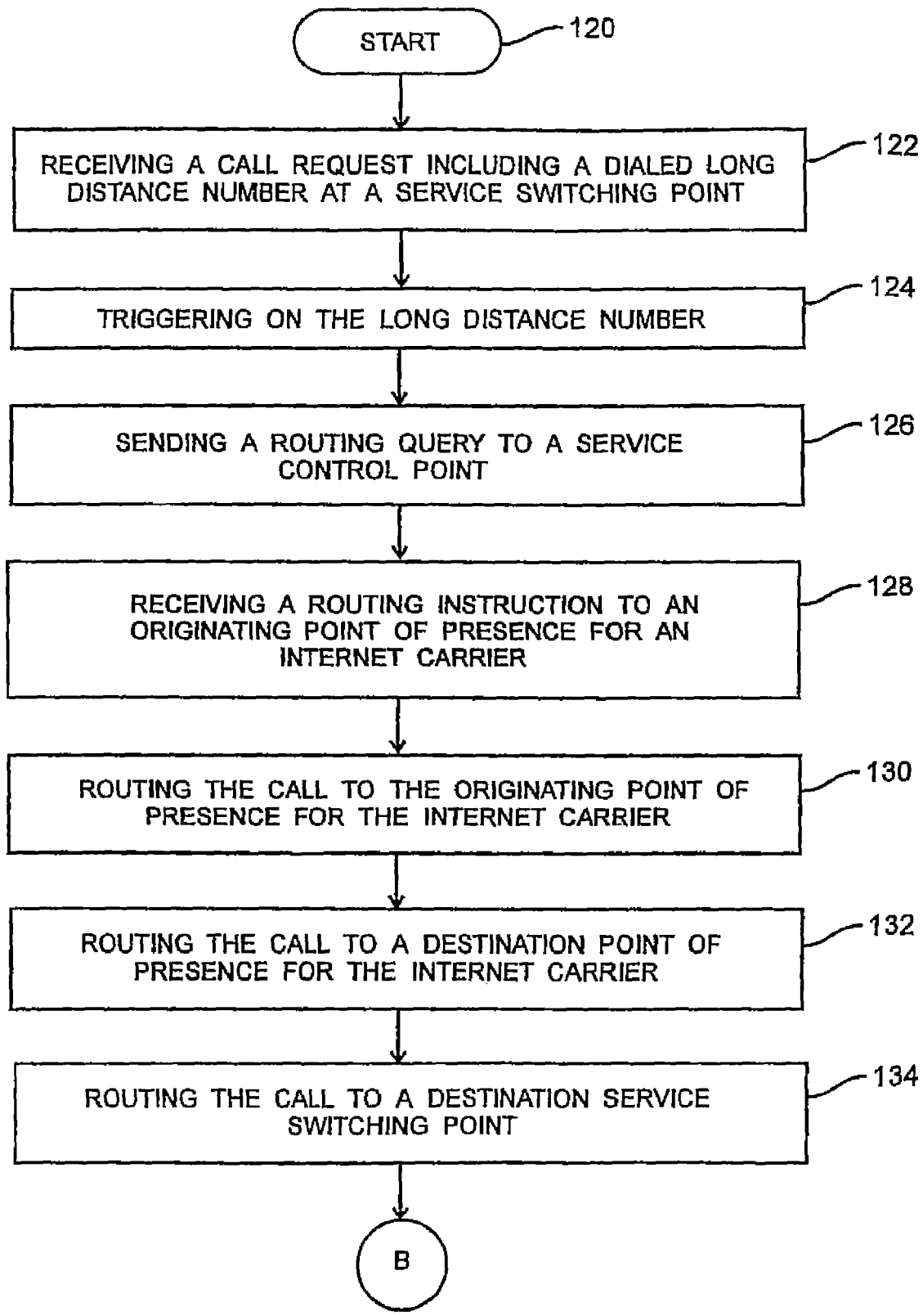
FIGS. 5 & 6 are a flow chart of the steps used in providing caller identification for calls placed over the internet in accordance with one embodiment of the invention.
Figure 6:
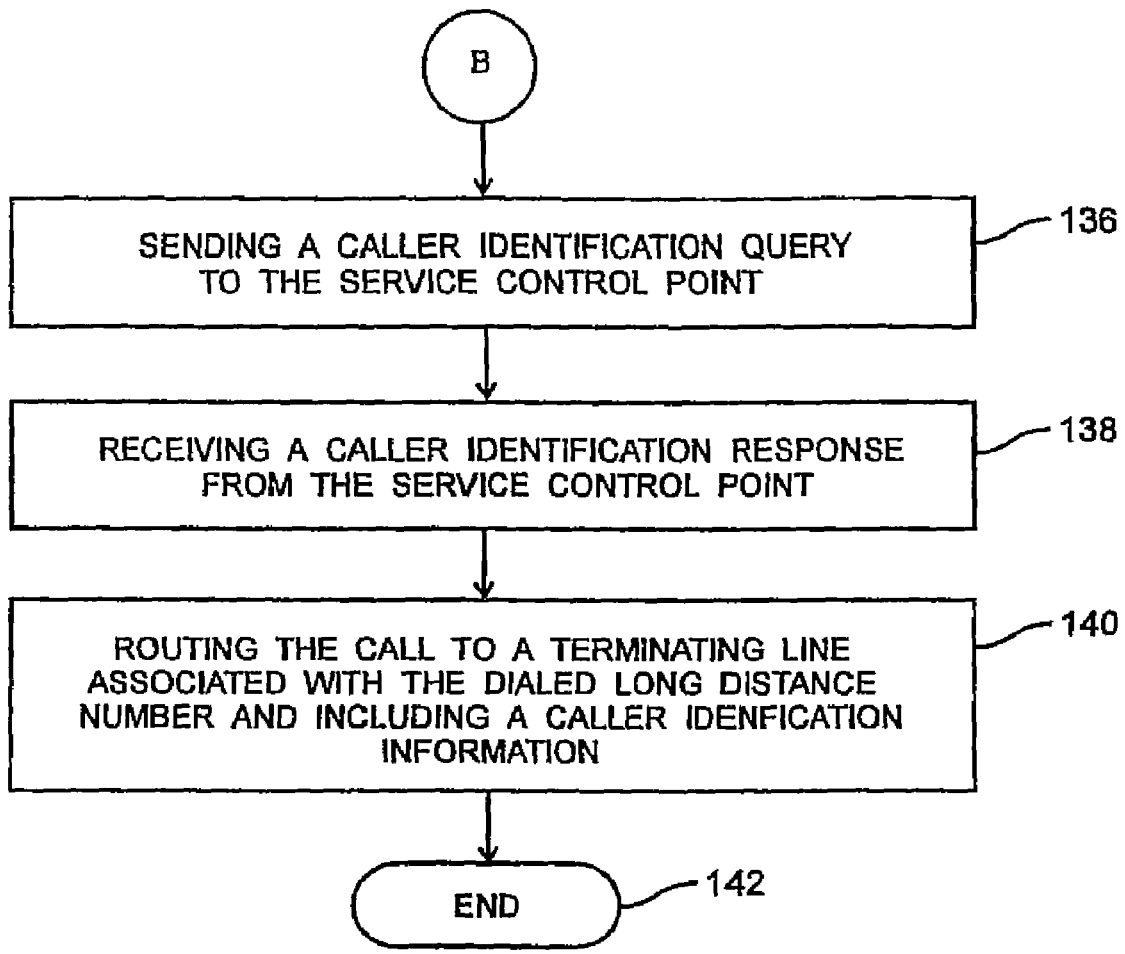

FIGS. 5 & 6 are a flow chart of the steps used in providing caller identification for calls placed over the internet in accordance with one embodiment of the invention. The process starts, step 120, by receiving a call request including a dialed long distance number at a service switching point at step 122. The long distance number is triggered on at step 124. A routing query is sent to a service control point at step 126. A routing instruction to an originating point of presence is received at step 128. The call is routed to the originating point presence for the internet carrier at step 130. The call is routed to a destination point of presence for the internet carrier at step 132. The call is routed to a destination service switching point at step 134. A caller identification query is sent to the service control point at step 136. A caller identification response from the service control point is received at step 138. At step 140, the call is routed to a terminating line associated with the dialed long distance number and includes a caller identification information which ends the process at step 142. In another embodiment, the dialed long distance number and originating telephone line is sent as part of the routing query.

In another embodiment it is determined if the call should be routed to the internet carrier. When the call is to be routed to the internet carrier, an authentication code is selected. The authentication code is sent as part of the routing instruction. The authentication code is sent to the originating POP. The authentication code is sent to the destination POP. The authentication code is then sent to the destination SSP. The destination SSP sends the authentication code as part of the caller identification query to the SCP. The SCP determines if the authentication code is valid. When the authentication code is not valid, the call is routed to the terminating line without the caller identification information.

In another embodiment, the SCP determines if the call is to be routed to the internet carrier. When the call is to be routed to the internet carrier, a call processing record including an originating telephone line and the dialed long distance telephone number is stored. The SCP determines if the caller identification query is associated with the call processing record. A caller identification valid is sent as part of the caller identification response when the caller identification query is associated with the call processing record. The caller identification includes sending the originating telephone line and the dialed long distance number. The caller identification valid is sent as part of the caller identification response when the caller identification query is associated with the call processing record. When the caller identification query is not associated with the call processing record, the call is routed to the terminating line without the caller identification information.

Figure 7:
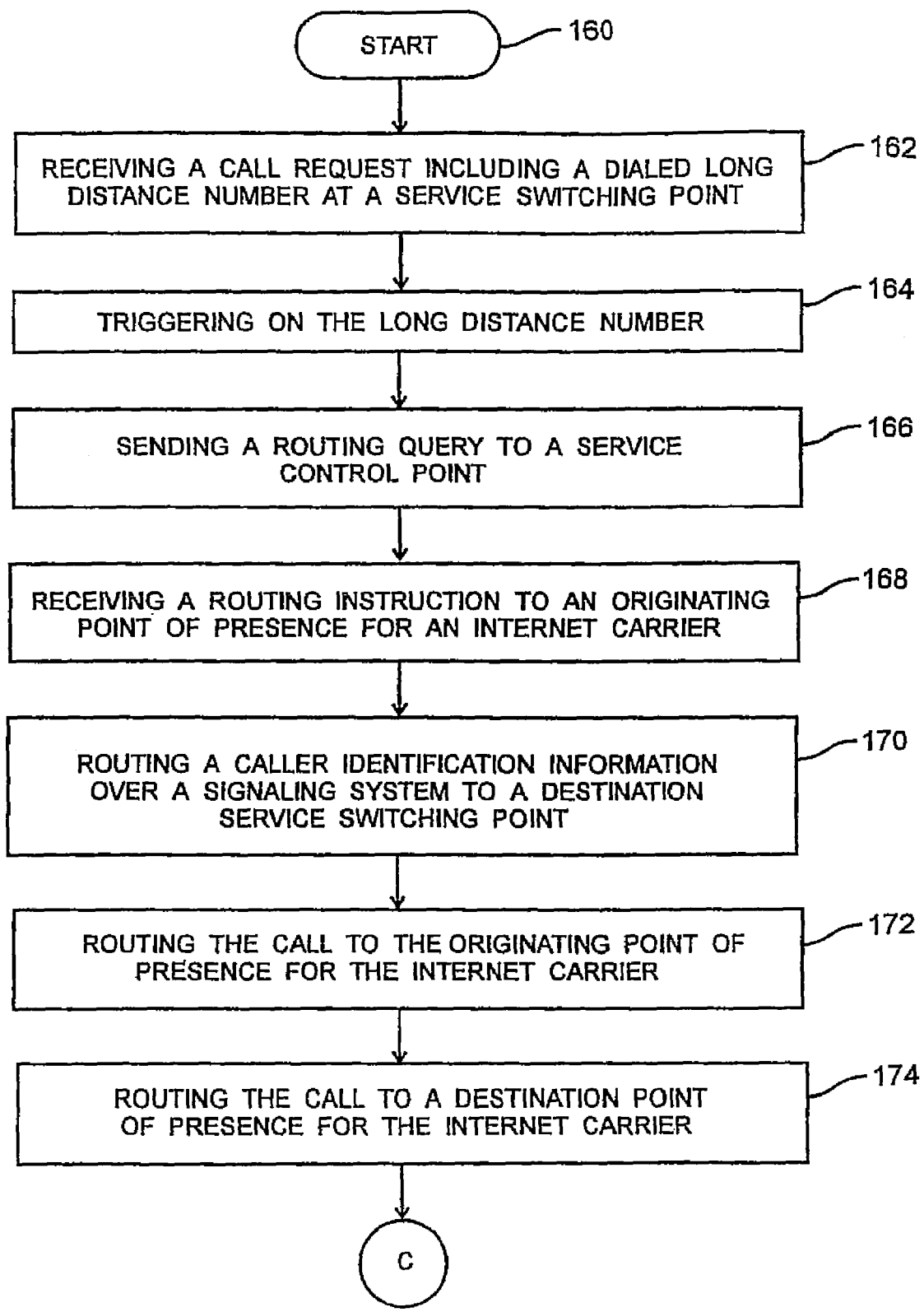
FIGS. 7 & 8 are a flow chart of the steps used in providing caller identification for calls placed over the internet in accordance with one embodiment of the invention.
Figure 8:
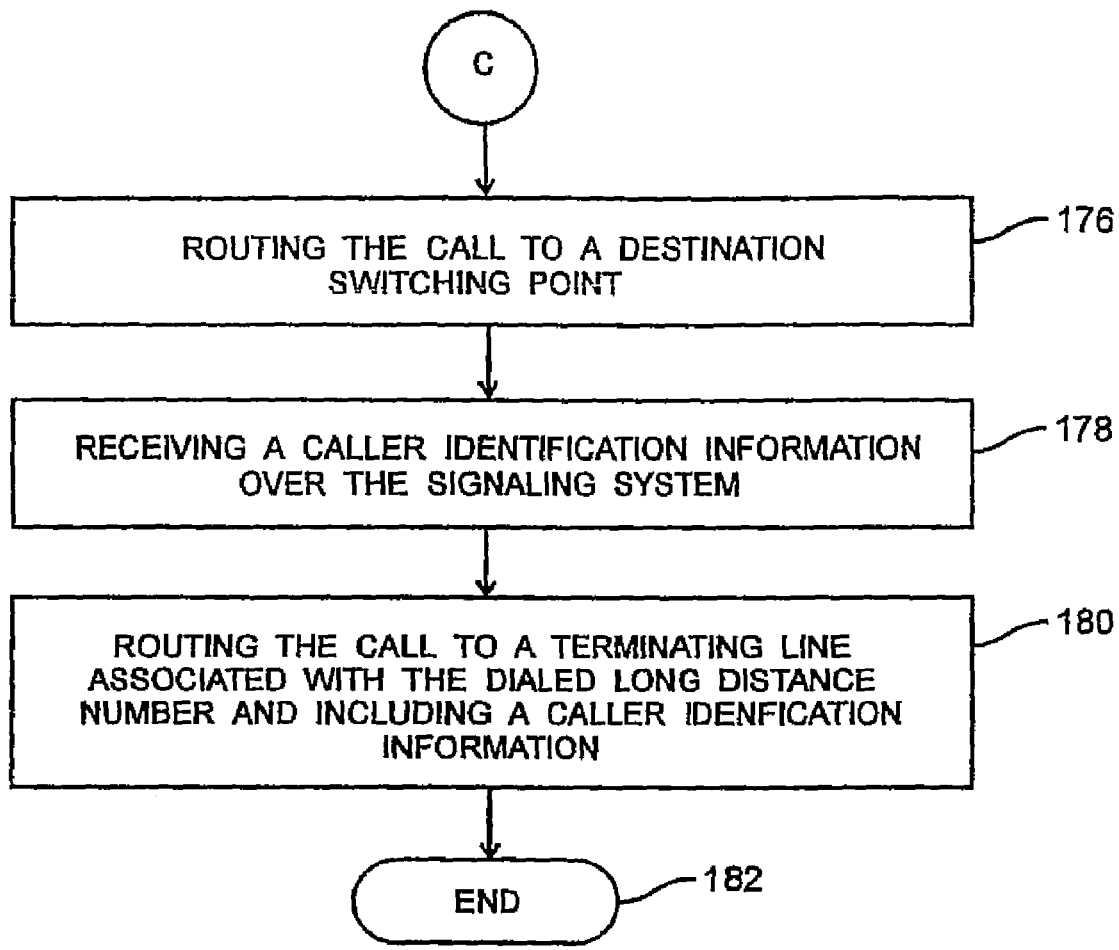

FIGS. 7 & 8 are a flow chart of the steps used in providing caller identification for calls placed over the internet in accordance with one embodiment of the invention. The process starts, step 160, by receiving a call request including a dialed long distance number at a service switching point at step 162. The long distance number is triggered on at step 164. A routing query is sent to a service control point at step 166. A routing instruction to an originating point of presence for an internet carrier is received at step 168. A caller identification information is routed over a signaling system to a destination service switching point at step 170. The call is routed to the originating point of presence for the internet carrier at step 172. The call is routed to a destination point of presence for the internet carrier at step 174. The call is routed to a destination service switching point at step 176. The caller identification information is received over the signaling system at step 178. At step 180 the call is routed to a terminating line associated with the dialed long distance number and includes the caller identification information which ends the process at step 182.

Note that call identification information can include both caller ID and/or charged party ID. In addition, the caller ID may be sent by one of the methods described above, while the charged party ID may be sent by another method described above for the same call. For instance, the caller ID may be encrypted and passed through the internet and the charged party ID routed through the intelligent network for the same call.

Using the methods described above caller identification information can be sent securely and accurately, when a long distance call is carried over the internet.

The methods described herein can be implemented as computer-readable instructions stored on a computer-readable storage medium that when executed by a computer will perform the methods described herein.

While the invention has been described in conjunction with specific embodiments thereof it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing caller identification for voice over Internet calls, the method comprising:
   attempting to electronically decrypt caller identification information contained in a call received via the Internet; and
   electronically providing the decrypted caller identification information to a called destination when the caller identification information can be decrypted; and
   electronically routing the call to the called destination without the caller identification information when the caller identification cannot be decrypted.

2. The method of claim 1 wherein attempting to decrypt the caller identification information contained in the call comprises routing the caller identification information to a service control point.

3. The method of claim 2 wherein the service control point attempts to decrypt the caller identification information.

4. The method of claim 1 wherein the caller identification information is considered valid if it can be decrypted.

5. The method of claim 1 wherein the caller identification information includes a charged party identification.

6. A method of providing caller identification for voice over Internet calls, the method comprising:
   electronically transmitting at least one of caller identification information and charged party information associated with a call as an in-band signal through the Internet; and
   electronically transmitting at least one of caller identification information and charged party information associated with the call as an out of band signal.

7. The method of claim 6 wherein transmitting the in-band signal further comprises encrypting the at least one of the caller identification information and the charged party information, and transmitting the encrypted information through the Internet with the call.

8. The method of claim 6 wherein transmitting the at least one of the caller identification information and the charged party information as the out of band signal comprises transmitting the at least one of the caller identification information and the charged party information through the advanced intelligent network.

* * * * *